(12) United States Patent
Chen et al.

(10) Patent No.: US 12,065,344 B2
(45) Date of Patent: Aug. 20, 2024

(54) THIN FILM TRANSFER VEHICLE

(71) Applicants: Chengdu BOE Optoelectronics Technology Co., Ltd., Sichuan (CN); BOE Technology Group Co., Ltd., Beijing (CN)

(72) Inventors: Dening Chen, Beijing (CN); Rubing Yang, Beijing (CN); Gang Xiong, Beijing (CN); Quan Zhong, Beijing (CN); Yong Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 424 days.

(21) Appl. No.: 17/471,186

(22) Filed: Sep. 10, 2021

(65) Prior Publication Data

US 2022/0204331 A1 Jun. 30, 2022

(30) Foreign Application Priority Data

Dec. 24, 2020 (CN) .......................... 202023165160.1

(51) Int. Cl.
*B66F 9/18* (2006.01)
*B65G 49/05* (2006.01)
*B65H 5/04* (2006.01)

(52) U.S. Cl.
CPC ................ *B66F 9/18* (2013.01); *B65G 49/05* (2013.01); *B65H 5/04* (2013.01); *B65H 2701/112* (2013.01)

(58) Field of Classification Search
CPC .. B66F 9/18; B65G 49/05; B65H 5/04; B65H 2701/112; A47B 47/03; A47B 2096/207

USPC ........... 211/41.1, 41.15, 41.14, 41.13, 41.17, 211/41.18, 180; 312/265.5; 361/679.51, 361/692, 693
See application file for complete search history.

(56) References Cited

U.S. PATENT DOCUMENTS

| | | | | |
|---|---|---|---|---|
| 504,279 | A * | 8/1893 | Raymond | A47F 7/0042 211/41.15 |
| 4,872,090 | A * | 10/1989 | Taylor | H05K 9/0016 361/818 |
| 6,102,501 | A * | 8/2000 | Chen | G06F 1/181 312/293.3 |
| 6,422,406 | B1 * | 7/2002 | Kessel | A47F 7/28 211/49.1 |
| 6,672,955 | B2 * | 1/2004 | Charron | F24F 11/0001 361/691 |

(Continued)

FOREIGN PATENT DOCUMENTS

CN 214355711 U * 10/2021 ............. B65G 49/05

*Primary Examiner* — Jennifer E. Novosad
(74) *Attorney, Agent, or Firm* — Ling Wu; Stephen Yang; Ling and Yang Intellectual Property (57) ABSTRACT

A thin film transfer vehicle includes a base frame, a bearing frame and a baffle disposed on the base frame; the bearing frame has multiple support layers from top to bottom, and the multiple support layers are configured to carry multiple thin films respectively; the baffle is disposed in front of the bearing frame along a moving direction of the transfer vehicle, and multiple openings are disposed on the baffle, which are disposed in multiple rows and columns; and the support layers correspond to positions between two adjacent rows of the openings.

18 Claims, 9 Drawing Sheets

(56) References Cited

U.S. PATENT DOCUMENTS

| | | | | |
|---|---|---|---|---|
| 6,826,057 B1* | 11/2004 | Gundogan | ........... | H05K 7/1425 361/726 |
| 7,128,219 B2* | 10/2006 | Marraffa | ............. | H01M 50/262 211/49.1 |
| 7,262,972 B1* | 8/2007 | Gundogan | ........... | H05K 9/0062 361/818 |
| 7,334,692 B2* | 2/2008 | Black | .................... | A47B 47/025 211/187 |
| 7,387,213 B1* | 6/2008 | Smalley | .................. | A47F 5/101 211/106 |
| 7,508,663 B2* | 3/2009 | Coglitore | ........... | H05K 7/20736 165/122 |
| 7,527,274 B2* | 5/2009 | Strauss | ................. | B65G 49/062 211/41.15 |
| 7,537,125 B2* | 5/2009 | Plouchart | ................ | B25H 3/04 211/198 |
| 7,839,637 B2* | 11/2010 | Pakravan | ........... | H05K 7/20572 165/122 |
| 8,315,052 B2* | 11/2012 | Chan | .................... | H05K 7/1488 312/265.5 |
| 8,359,986 B2* | 1/2013 | Sekiguchi | ................. | E05G 1/06 109/57 |
| 8,405,984 B2* | 3/2013 | Donowho | ........... | H05K 7/20572 312/265.6 |
| 8,668,291 B2* | 3/2014 | Kopf | ...................... | B23P 11/00 312/265.6 |
| 8,675,357 B2* | 3/2014 | Namek | ............... | H05K 7/20745 361/692 |
| 8,863,671 B2* | 10/2014 | Shaw | ..................... | B65D 19/38 108/56.3 |
| 8,958,203 B2* | 2/2015 | Yang | .................. | H05K 7/20145 312/236 |
| 9,066,449 B2* | 6/2015 | Jun | ...................... | H05K 7/20718 |
| 9,596,781 B2* | 3/2017 | Schrader | ............ | H05K 7/20736 |
| 9,756,765 B1* | 9/2017 | Michaud | ............ | H05K 7/1488 |
| 10,004,163 B2* | 6/2018 | Smith | ................... | H05K 7/20736 |
| 10,206,306 B2* | 2/2019 | Drake | ...................... | H05K 7/18 |
| 11,096,307 B2* | 8/2021 | Sassano | ............... | H05K 5/0226 |
| 11,172,770 B2* | 11/2021 | Nguyen | ................ | A47F 3/0469 |
| 2004/0201336 A1* | 10/2004 | Chen | ....................... | G06F 1/181 312/265.6 |
| 2010/0117496 A1* | 5/2010 | Clarke | ...................... | A47F 5/10 40/564 |
| 2014/0329454 A1* | 11/2014 | Liang | .................. | H05K 7/1404 211/180 |
| 2022/0204331 A1* | 6/2022 | Chen | ........................ | B65H 5/04 |

\* cited by examiner

THIN FILM TRANSFER VEHICLE

CROSS-REFERENCE TO RELATED APPLICATION

The present application claims priority of Chinese Patent Application No. 202023165160.1 filed to the CNIPA on Dec. 24, 2020, the content of which is hereby incorporated by reference.

TECHNICAL FIELD

Embodiments of the present disclosure relate to the technical field of transfer vehicles, in particular to a thin film transfer vehicle.

BACKGROUND

In a production process of a display panel, thin films need to be transported in batches by using a transfer vehicle, and the thin films are loaded in a bearing frame of the transfer vehicle. The carrier has a four-sided open design. During the movement of the transfer vehicle, air flow may freely flow over a surface of a thin film, as the thin film is very soft, when the transfer vehicle moves at a high speed, the wind speed is high, which will cause the thin film to warp and further lead to a deviation of the thin film, thereby affecting transfer accuracy and accuracy of taking thin films.

SUMMARY

The following is a summary of subject matters described in detail in the present disclosure. This summary is not intended to limit the scope of protection of the claims. The present disclosure provides a thin film transfer vehicle, which includes a base frame, a bearing frame and a baffle disposed on the base frame;

the bearing frame is provided with multiple support layers disposed from top to bottom, and the multiple support layers are configured to carry multiple thin films respectively;

the baffle is disposed in front of the bearing frame along a moving direction of the transfer vehicle, and multiple openings are formed on the baffle, and the multiple openings are disposed in multiple rows and columns; and each of the support layers corresponds to a position between two adjacent rows of the openings.

In an exemplary embodiment, a distance between the two adjacent support layers is h, and an aperture of an opening is d, where $(h/2-h/5) \leq d \leq (h/2+h/10)$.

In an exemplary embodiment, a shape of the opening is round, oval or rectangular.

In an exemplary embodiment, when the shape of the opening is non-circular, a width of the opening in a vertical direction is smaller than the distance h between the two adjacent support layers.

In an exemplary embodiment, the bearing frame includes multiple columns disposed in a circumferential direction of the thin films;

In a row direction of the multiple openings, the openings bypass the columns.

In an exemplary embodiment, the multiple columns include a first set of columns and a second set of columns, the first set of columns and the second set of columns are respectively disposed on two sides of a width direction of the thin films, wherein the first set of columns include multiple first columns and the second set of columns include multiple second columns; and a width of the multiple openings in the row direction is not larger than a distance between the first set of columns and the second set of columns.

In an exemplary embodiment, the multiple first columns are further connected with each other by first diagonal bars, and the multiple second columns are further connected with each other by second diagonal bars.

In an exemplary embodiment, a side surface of the baffle facing the moving direction of the transfer vehicle is a first side surface of the baffle, a side surface opposite to the first side surface of the baffle is a second side surface of the baffle, and the baffle includes a first vertical side edge and a second vertical side edge which are oppositely disposed, and an edge region near the first vertical side edge and the second vertical side edge of the first side surface of the baffle is a curved surface bent toward the second side surface of the baffle.

In an exemplary embodiment, a radius of curvature of the curved surface is 50 mm to 80 mm.

In some exemplary embodiments, a side surface of the baffle away from the moving direction of the transfer vehicle is provided with longitudinal reinforcing ribs extending from a top end of the baffle to a bottom end of the baffle, which are divided into a first reinforcing rib segment, a second reinforcing rib segment and a third reinforcing rib segment from top to bottom, wherein widths of the first reinforcing rib segment, the second reinforcing rib segment, and the third reinforcing rib segment gradually increase.

In an exemplary embodiment, the width of the first reinforcing rib segment is 10 mm to 20 mm, and the width of the third reinforcing rib segment is 70 mm to 90 mm; there is a smooth transition between the first reinforcing rib segment and the second reinforcing rib segment and there is a smooth transition between the second reinforcing rib segment and the third reinforcing rib segment.

In an exemplary embodiment, a side surface of the baffle opposite to the first side surface is a second side surface of the baffle, and the second side surface of the baffle is further provided with two transverse reinforcing ribs, which divide the longitudinal reinforcing ribs into the first reinforcing rib segment, the second reinforcing rib segment and the third reinforcing rib segment.

In an exemplary embodiment, four sides of the baffle are each provided with a flange protruding toward the second side surface of the baffle, and two ends of the longitudinal reinforcing ribs and two ends of the transverse reinforcing ribs are respectively connected to corresponding flanges.

In an exemplary embodiment, the multiple columns further include a third set of columns, which are disposed on a side of a length direction of the thin film and disposed near the baffle, and the third set of columns include multiple third columns;

a first column is provided with multiple first support rods from top to bottom; a second column is provided with multiple second support rods from top to bottom; and a third column is provided with multiple third support rods from top to bottom. The multiple first support rods, the multiple second support rods and the multiple third support rods located on same horizontal planes form the support layers.

In an exemplary embodiment, the number and heights of the first support rods on each first column are the same as those of the second support rods on each second column and those of the third support rods on each third column.

In an exemplary embodiment, the first support rods and the second support rods are respectively configured to be supported on two side edges of the thin films in the length direction and both extend along the width direction of the thin films; the third support rods are configured to be supported at one side edge of the thin films in the width direction and is disposed near the baffle; an end of each third support rod is fixed on the third column, and the other end of the third support rod extends along the length direction of the thin films.

In an exemplary embodiment, a length of a first support rod and a length of a second support rod are equal, and a length of the third support rod is greater than that of the first support rod or the second support rod.

In an exemplary embodiment, a sum of the length of the first support rod and the length of the second support rod is smaller than a width of the thin films, and the length of the third support rod is greater than half of the length of the thin films and less than a length of the thin films.

In an exemplary embodiment, the bearing frame further includes a top plate disposed at top ends of the multiple columns, and a side of the bearing frame away from the baffle is provided with a transfer port configured to transfer the thin films into the bearing frame.

In an exemplary embodiment, the bearing frame further includes a bottom bracket disposed on the base frame, and bottom ends of the multiple columns are all fixed on the bottom bracket, and the top ends of the multiple are fixedly connected to the top plate.

Other aspects may be understood upon reading and understanding of the drawings and the detailed description.

BRIEF DESCRIPTION OF DRAWINGS

The drawings are used to provide a further understanding of technical solutions of the present disclosure and constitute a part of the description, which are used together with the embodiments of the present disclosure to explain the technical solutions of the present disclosure and do not constitute limitations on the technical solutions of the present disclosure.

DETAILED DESCRIPTION

The technical solutions of the disclosure will be further described below in combination with the drawings through specific embodiments. The specific embodiments described herein are only used to explain the present disclosure, but not to limit the present disclosure. The embodiments in the present disclosure and the features in the embodiments may be randomly combined with each other if there is no conflict.

Figure 1:
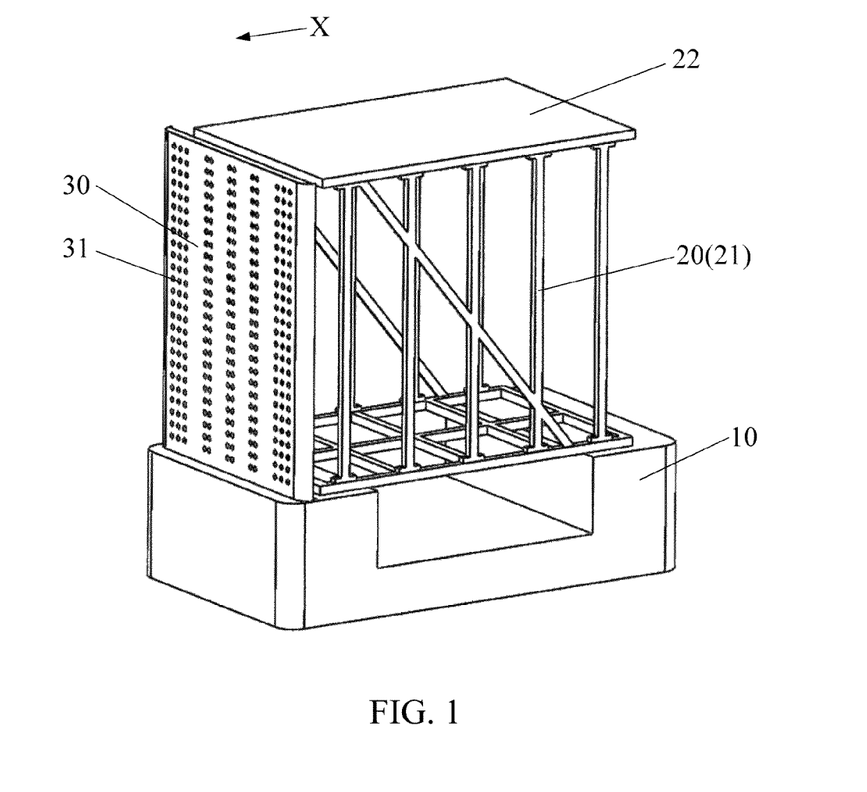
FIG. 1 is a schematic diagram of a partial structure of a thin film transfer vehicle according to an embodiment of the present disclosure.
Figure 6:
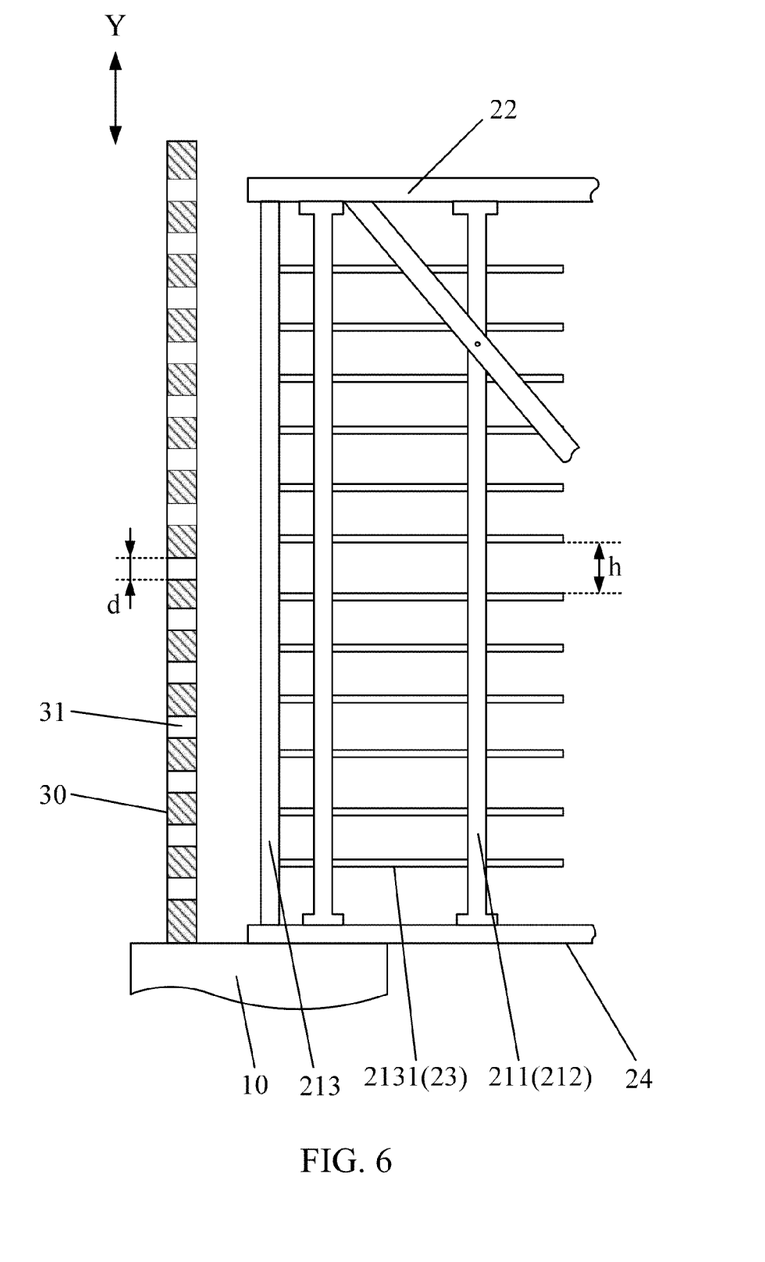
FIG. 6 is a schematic side view of a structure of the baffle and part of the bearing frame of the thin film transfer vehicle of FIG. 1.
Figure 7:
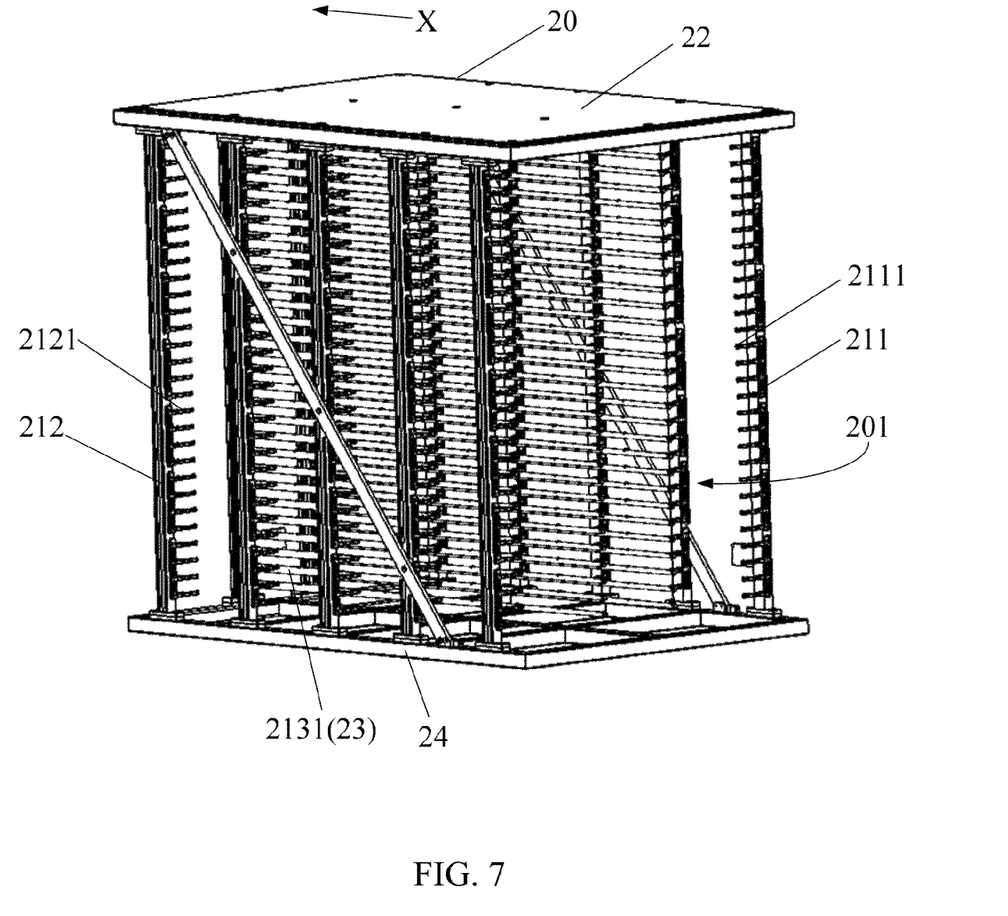
FIG. 7 is a schematic diagram of a structure of the bearing frame of the thin film transfer vehicle of FIG. 1.

An embodiment of the present disclosure provides a thin film transfer vehicle. For example, as shown in FIG. 1 and FIG. 7, the thin film transfer vehicle includes a base frame 10, and a bearing frame 20 and a baffle 30 disposed on the base frame 10. The bearing frame 20 is provided with multiple support layers 23 (shown in FIG. 7) from top to bottom, and the multiple support layers 23 are configured to respectively carry multiple thin films. In a moving direction X of the transfer vehicle, the baffle 30 is disposed in front of the bearing frame 20, and the baffle 30 is provided with multiple openings 31, wherein the multiple openings 31 are disposed in multiple rows and columns. As shown in FIG. 6, Y represents a column direction of the multiple openings 31, and the support layers 23 correspond to positions between two adjacent rows of the openings 31.

In the thin film transfer vehicle according to the embodiment of the present disclosure, the baffle 30 is disposed in front of the bearing frame 20 used for carrying thin films, and the multiple openings 31 arranged in multiple rows and columns are disposed on the baffle 30. The bearing frame 20 is provided with the multiple support layers 23 for respectively carrying multiple thin films from top to bottom, and the support layers 23 correspond to positions between two adjacent rows of openings 31 on the baffle 30. In this way, when the thin film transfer vehicle moves at a high speed, although air flow passing through the openings 31 on the baffle 30 has a high speed, wind force between two adjacent rows of openings 31 is the smallest. As the support layers 23 correspond to the positions between two adjacent rows of the openings 31 on the baffle 30, the thin films on the support layers 23 corresponds to the positions between two adjacent rows of the openings 31, and the wind force acted on the thin films here is the smallest, thus it is not easy to cause the thin films to warp or be deflected by the wind.

In some exemplary embodiments, as shown in FIG. 6, a distance between two adjacent support layers 23 is h, and an aperture of an opening 31 is d, where $d=h/2-h/5\sim h/2+h/10$. The aperture d of the opening 31 is smaller than the distance h between the two support layers 23. In this example, a shape of the opening 31 may be round, oval, rectangular, etc. When a shape of the opening 31 is non-circular, its width in a vertical direction is smaller than the distance h between the two adjacent support layers 23. In this example, the baffle 30 is provided with multiple openings 31, which also has effects of reducing weight and wind resistance.

Figure 5:
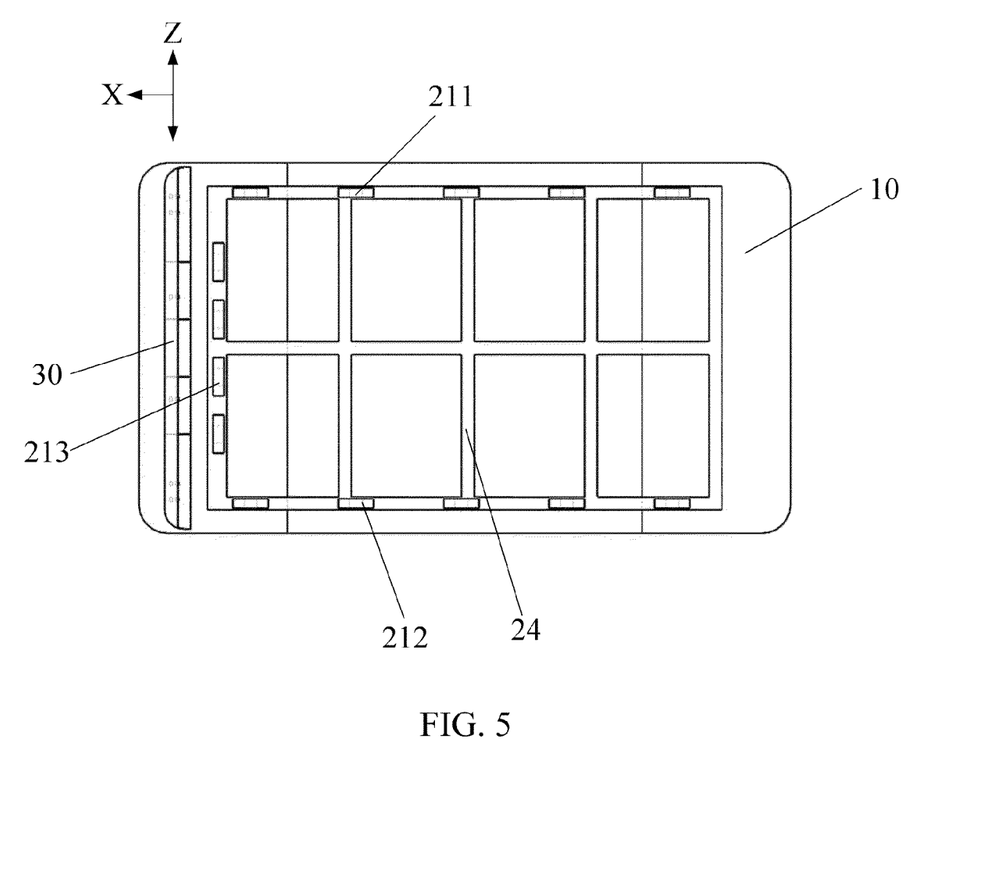
FIG. 5 is a schematic plan view of a structure of the baffle and a bearing frame of the thin film transfer vehicle of FIG. 1.

In some exemplary embodiments, as shown in FIG. 1 and FIG. 5, the bearing frame 20 includes multiple columns 21 (in some examples, the multiple columns 21 include multiple first columns 211, multiple second columns 212 and multiple third columns 213), wherein the multiple columns 21 are disposed in a circumferential direction of the thin films. In a row direction Z of the multiple openings 31, the openings 31 (not shown in FIG. 5) bypass the columns 21. According to a simulation experiment, in the row direction Z of the multiple openings 31, the openings 31 bypass the columns 21, so that during a moving process of the transfer vehicle, the air flow can be prevented from flowing to the columns 21 and to the thin films after bypassing the columns 21 which causes the air flow to aggregate, thus no local air flow aggregation will take place. If the openings 31 do not bypass the columns 21, distribution of the air flow will be uneven, which may cause the thin films to warp.

In some exemplary embodiments, as shown in FIG. 5, the multiple columns 21 include a first set of columns and a second set of columns, which are respectively disposed on two sides of the thin films in a width direction. The first set of columns include multiple first columns 211 and the second set of columns include multiple second columns 212. A width of the multiple openings 31 in the row direction Z is not larger than a distance between the first set of columns and the second set of columns. In this way, the row direction Z of the multiple openings 31 may be the same as the width direction of the thin films, and the width of the multiple openings 31 in the row direction Z may not be larger than the width of the thin films, so that it is possible to avoid large air flow aggregation on the two sides of the thin film in the width direction.

As an example of this embodiment, as shown in FIG. 5, the first set of columns include five first columns 211, and the second set of columns include five second columns 212, wherein the five first columns 211 and the five second columns 212 are respectively disposed on two side edges in a length direction of the thin films, and the five first columns 211 and five second columns 212 may all be disposed along the moving direction X of the transfer vehicle. The multiple columns 21 further include a third set of columns, which are disposed on a side of the length direction of the thin films and are disposed near the baffle 30, and the third set of columns include multiple third columns 213. In this example, four third columns 213 are provided, wherein the four third columns 213 are disposed along the row direction Z of the multiple openings 31, and are disposed on a side edge in the width direction of the thin films near the baffle 30.

Exemplarily, as shown in FIG. 7, a first column 211 is provided with multiple first support rods 2111 from top to bottom. A second column 212 is provided with multiple second support rods 2121 from top to bottom. A third column 213 is provided with multiple third support rods 2131 from top to bottom. The multiple first support rods 2111, the multiple second support rods 2121 and the multiple third support rods 2131 located on same horizontal planes form the support layers 23 respectively. In this example, the number and heights of the first support rods 2111 on each first column 211 may be the same as those of the second support rods 2121 on each second column 212 and those of the third support rods 2131 on each third column 213. Therefore multiple support layers 23 may be formed, and distances between two adjacent support layers 23 may be equal. The first support rods 2111 and the second support rods 2121 are respectively used to rest at two side edges of the thin films in a length direction and both extend along the width direction of the thin films. The third support rods 2131 are used to rest at a side edge of the thin films in a width direction and are disposed near the baffle 30. An end of each third support rod 2131 is fixed on the third column 213, and the other end of the third support rod 2131 extends along the length direction of the thin films. A length of the first support rods 2111 and a length of the second support rods 2121 may be equal, and a length of the third support rods 2131 may be greater than the length of the first support rods 2111 or the second support rods 2121. A sum of lengths of the first support rod 2111 and the second support rod 2121 may be smaller than the width of the thin films, and the length of the third support rod 2131 may be greater than half of the length of the thin film and smaller than the length of the thin film.

Exemplarily, as shown in FIG. 7, the bearing frame 20 may further include a top plate 22 disposed at top ends of the first columns 211, the second columns 212 and the third columns 213, and a transfer port 201 is disposed at a side of the bearing frame 20 away from the baffle 30, wherein the transfer port 201 is configured to transfer thin films into the bearing frame 20. The bearing frame 20 may further include a bottom bracket 24 disposed on the base frame 10, wherein bottom ends of the multiple first columns 211, the multiple second columns 212 and the multiple third columns 213 are fixed on the bottom bracket 24, and top ends thereof are fixedly connected to the top plate 22. The multiple first columns 211 may also be connected with each other by first diagonal bars, and the second columns 212 may also be connected with each other by second diagonal bars, so as to improve an overall strength of the bearing frame 20.

In some exemplary embodiments, the baffle 30 may be disposed only in front of the bearing frame 20 along the moving direction of the transfer vehicle, as shown in FIG. 1. Alternatively, baffles may be disposed on all three sides of the bearing frame 20 except the side of the transfer port 201.

Figure 2A:
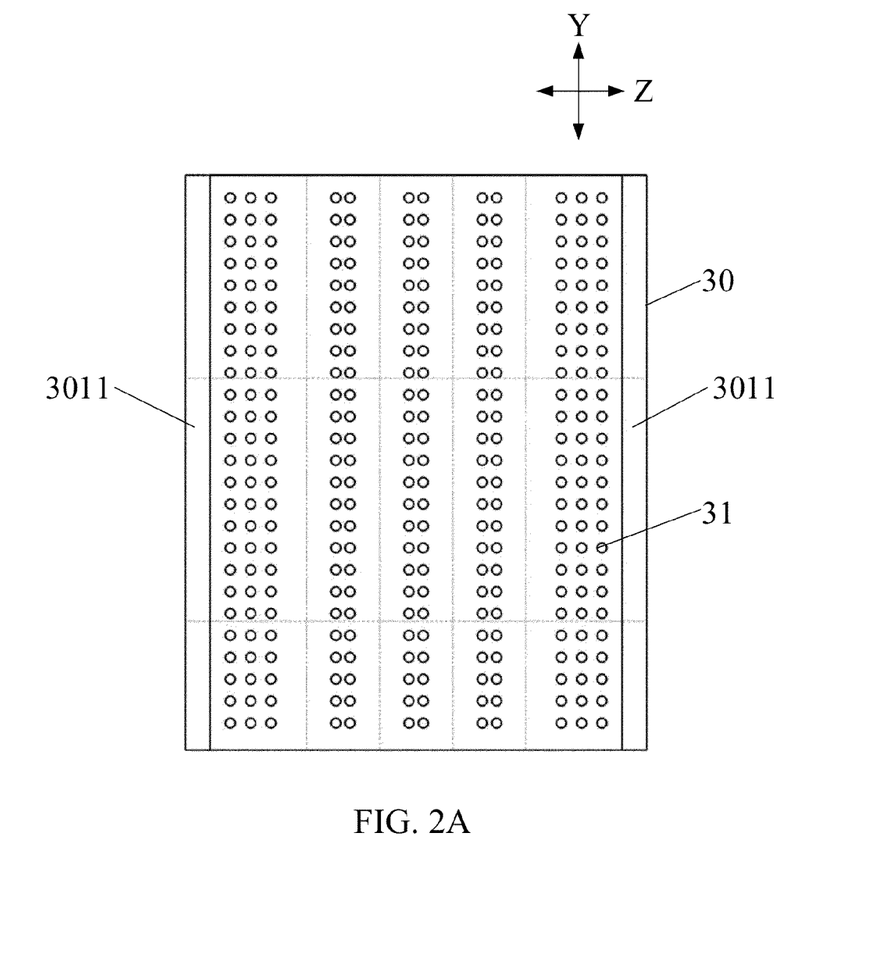
FIG. 2A is a front schematic view of a structure of a baffle of the thin film transfer vehicle of FIG. 1.
Figure 2B:
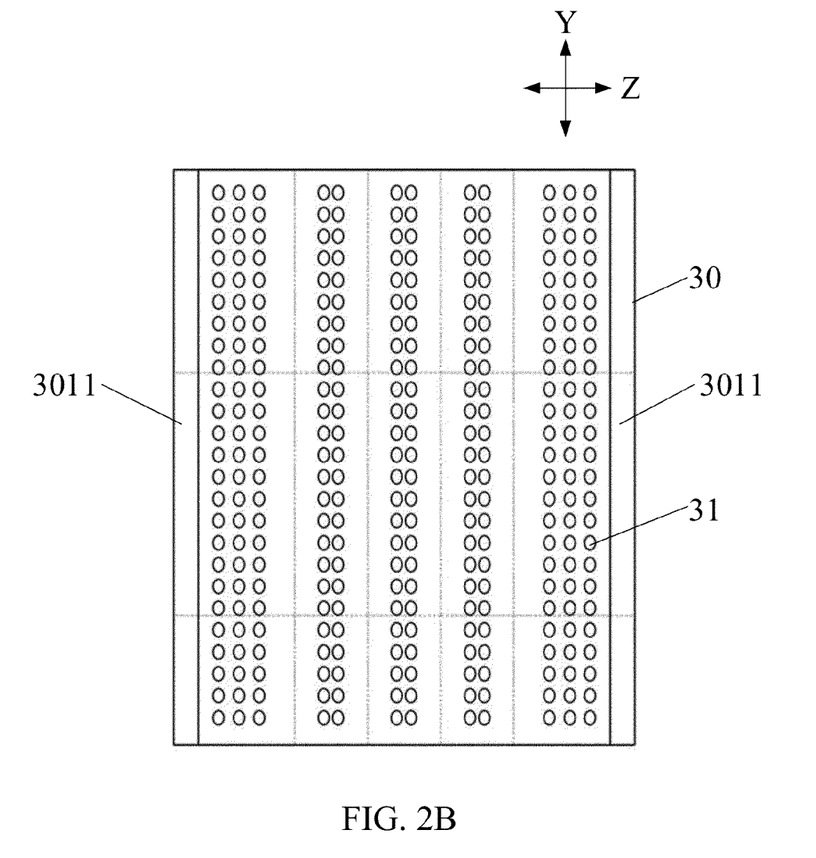
FIG. 2B is another front schematic view of a structure of a baffle of the thin film transfer vehicle of FIG. 1.
Figure 2C:
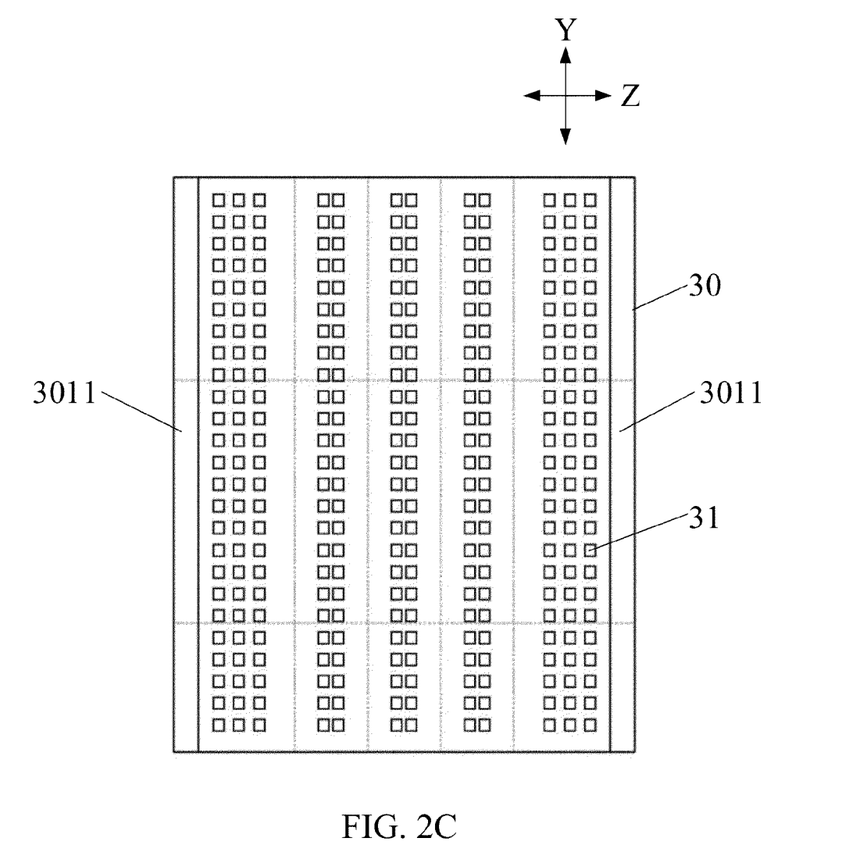
FIG. 2C is another front schematic view of a structure of a baffle of the thin film transfer vehicle of FIG. 1.
Figure 3:
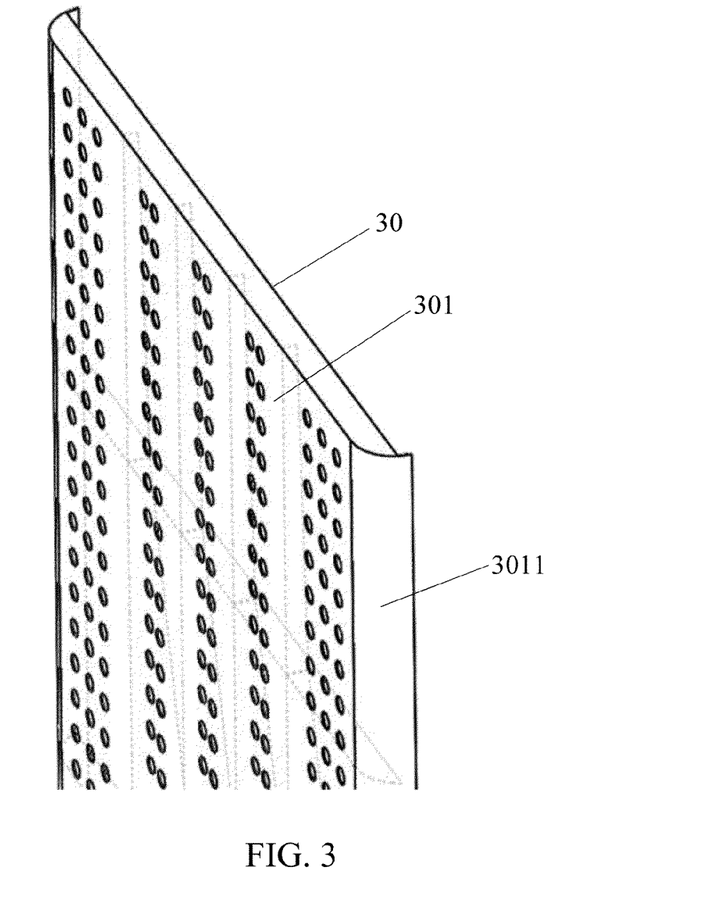
FIG. 3 is a schematic diagram of a local structure of the baffle of FIG. 2A.
Figure 4:
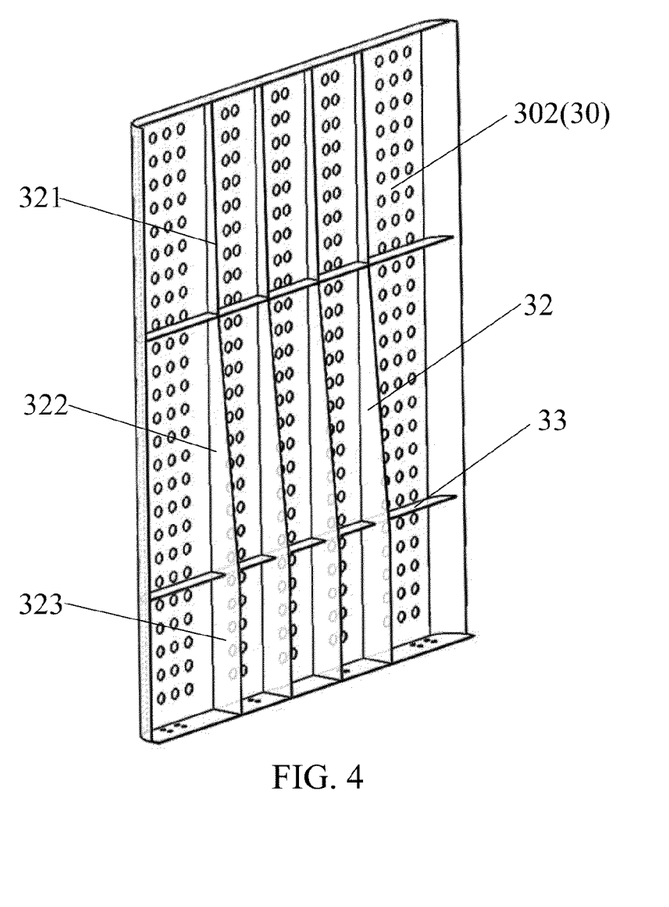
FIG. 4 is a three-dimensional schematic diagram of a structure of the baffle of FIG. 2A.

In some exemplary embodiments, as shown in FIG. 2A and FIG. 3, a side surface of the baffle 30 facing the moving direction of the transfer vehicle is a first side surface 301 of the baffle 30, and a side surface opposite to the first side surface of the baffle 30 is a second side surface 302 of the baffle 30 (shown in FIG. 4). The baffle 30 includes a first vertical side edge and a second vertical side edge which are oppositely disposed. An edge region of the first side surface 301 of the baffle 30 near the first vertical side edge and the second vertical side edge is a curved surface 3011 bent toward the second side surface 302 of the baffle 30, wherein a radius of curvature of the curved surface 3011 may be 50 mm-80 mm. In this way, by designing both side edges of the first side surface 301 of the baffle 30 to be streamlined, an aerodynamic performance of the baffle 30 may be improved by reducing abrupt changes of structural shape. Because both sides of the baffle 30 tend to be smooth, the airflow will flow evenly under a viscous action of air, which basically presents laminar flow with a certain drag reduction effect. Most of the airflow may also pass by both sides of the baffle 30, and a small part of the airflow flows to the openings 31 on the baffle 30. Since the support layers 23 correspond to the positions between two adjacent rows of openings 31, in this way, a small part of the airflow flowing to the opening 31 on the baffle 30 can flow between two adjacent thin films, where the wind force is relatively small, and it will not cause the thin film to warp.

In some exemplary embodiments, as shown in FIG. 4, a side surface of the baffle 30 away from the moving direction of the transfer vehicle (i.e., the second side surface 302 of the baffle 30) is provided with longitudinal reinforcing ribs 32 extending from a top end of the baffle 30 to a bottom end of the baffle 30, wherein the reinforcing ribs 32 are divided into a first reinforcing rib segment 321, a second reinforcing rib segment 322 and a third reinforcing rib segment 323 from top to bottom, and widths of the first reinforcing rib segment 321, the second reinforcing rib segment 322, and the third reinforcing rib segment 323 gradually increase. For example, the width of the first reinforcing rib segment 321 is 10 mm-20 mm, and the width of the third reinforcing rib segment 323 is 70 mm-90 mm, and there is a smooth transition between the first reinforcing rib segment and the second reinforcing rib segment and there is a smooth transition between the second reinforcing rib segment and the third reinforcing rib segment. In this example, multiple longitudinal reinforcing ribs 32 may be arranged in parallel, and the second side surface 302 of the baffle 30 may also be provided with transverse reinforcing ribs 33. Two reinforcing ribs 33 may be provided, the two reinforcing ribs 33 divide the longitudinal reinforcing ribs 32 into the first reinforcing rib segment 321, the second reinforcing rib segment 322 and the third reinforcing rib segment 323. By disposing (possibly welding) the longitudinal reinforcing ribs 32 and the transverse reinforcing ribs 33, strength of the baffle 30 may be improved. In some examples, four side edges of the baffle 30 may be provided with flanges protruding toward the second side surface 302 of the baffle 30, and two ends of each longitudinal reinforcing rib 32 and each transverse reinforcing rib 33 may be connected to the corresponding flanges, respectively. Multiple bolt holes may be disposed on the flange at a bottom of the baffle 30, and the baffle 30 may be fixed on the frame by bolts passing through the bolt holes.

In some exemplary embodiments, the support layers 23 correspond to positions between two adjacent rows of the openings 31, and an aperture d of an opening 31 is smaller than a distance h between the two support layers 23. In a row direction Z of the multiple openings 31, the openings 31 bypass the columns 21. Two sides of the first side surface 301 of the baffle 30 are provided with curved surfaces 3011. Therefore, resistance force on the baffle may be reduced by 10%, and airflow velocity at a front end of the thin films may be reduced by 3 times, thus effectively preventing the thin films from warping.

In the description of embodiments of the present disclosure, unless otherwise explicitly specified or defined, the terms "connect", "fixed connection", "install" and "assemble" are to be understood broadly, for example, a connection may be a fixed connection, or a detachable connection, or an be integral connection. The terms "install", "connect" and "fixed connection" may refer to a direct connection, or an indirect connection through an intermediate medium, or an internal connection between two elements. Those of ordinary skills in the art may understand the specific meanings of the above mentioned terms in the present disclosure according to specific context.

What is claimed is:

1. A thin film transfer vehicle, comprising: a base frame, a bearing frame and a baffle disposed on the base frame;
the bearing frame is provided with a plurality of support layers disposed from top to bottom, and the plurality of support layers are configured to carry a plurality of thin films respectively;
the baffle is disposed in front of the bearing frame along a moving direction of the transfer vehicle, a plurality of openings are formed in the baffle, and the plurality of openings are disposed in a plurality of rows and columns; and
each of the support layers corresponds to a position between two adjacent rows of the openings;
wherein the bearing frame comprises a plurality of columns, and a space defined by the plurality of columns accommodate the thin films which are horizontally disposed; along a row direction of the plurality of openings, the openings bypass the columns.

2. The thin film transfer vehicle according to claim 1, wherein a distance between the two adjacent support layers is h, and an aperture of an opening is d, where $(h/2-h/5) \leq d \leq (h/2+h/10)$.

3. The thin film transfer vehicle according to claim 1, wherein a shape of the opening is round, oval or rectangular.

4. The thin film transfer vehicle according to claim 3, wherein when the shape of the opening is oval or rectangular, a width of the opening in a vertical direction is smaller than the distance h between the two adjacent support layers.

5. The thin film transfer vehicle according to claim 1, wherein the plurality of columns comprise a first set of columns and a second set of columns; the first set of columns comprises a plurality of first columns, and the second set of columns comprises a plurality of second columns; and
a width of the plurality of openings in the row direction is not larger than a distance between the first set of columns and the second set of columns.

6. The thin film transfer vehicle according to claim 5, wherein the plurality of first columns are further connected with each other by first diagonal bars, and the plurality of second columns are further connected with each other by second diagonal bars.

7. The thin film transfer vehicle according to claim 5, wherein the plurality of columns further comprise a third set of columns disposed near the baffle, and the third set of columns comprises a plurality of third columns;
a first column is provided with a plurality of first support rods from top to bottom; a second column is provided with a plurality of second support rods from top to bottom; and a third column is provided with a plurality of third support rods from top to bottom; the plurality of first support rods, the plurality of second support rods and the plurality of third support rods located on same horizontal planes form the support layers.

8. The thin film transfer vehicle according to claim 7, wherein the number and heights of the first support rods on each first column are the same as the number and heights of the second support rods on each second column and the number and heights of the third support rods on each third column.

9. The thin film transfer vehicle according to claim 7, wherein the first support rods and the second support rods both extend along a horizontal direction; the third support rods are disposed near the baffle; an end of each third support rod is fixed on the third column, and the other end of the third support rod extends along the horizontal direction.

10. The film transfer vehicle according to claim 7, wherein a length of a first support rod and a length of a second support rod are equal, and a length of the third support rod is greater than the length of the first support rod or the second support rod.

11. The thin film transfer vehicle according to claim 1, wherein a side surface of the baffle facing the moving direction of the transfer vehicle is a first side surface of the baffle, a side surface opposite to the first side surface of the baffle is a second side surface of the baffle, and the baffle comprises a first vertical side edge and a second vertical side edge which are oppositely disposed, and an edge region near the first vertical side edge and the second vertical side edge of the first side surface of the baffle is a curved surface bent toward the second side surface of the baffle.

12. The thin film transfer vehicle according to claim 11, wherein a radius of curvature of the curved surface is 50 mm to 80 mm.

13. The thin film transfer vehicle according to claim 1, wherein a side surface of the baffle away from the moving direction of the transfer vehicle is provided with longitudinal reinforcing ribs extending from a top end of the baffle to a bottom end of the baffle, and the longitudinal reinforcing ribs are divided into a first reinforcing rib segment, a second reinforcing rib segment and a third reinforcing rib segment from top to bottom, and widths of the first reinforcing rib segment, the second reinforcing rib segment and the third reinforcing rib segment gradually increase from a top of the baffle to a bottom of the baffle.

14. The thin film transfer vehicle according to claim 13, wherein the width of the first reinforcing rib segment is 10 mm to 20 mm, and the width of the third reinforcing rib segment is 70 mm to 90 mm; there is a smooth transition between the first reinforcing rib segment and the second reinforcing rib segment and there is a smooth transition between the second reinforcing rib segment and the third reinforcing rib segment.

15. The thin film transfer vehicle according to claim 13, wherein a side surface of the baffle opposite to the first side surface is a second side surface of the baffle, and the second side surface of the baffle is further provided with two transverse reinforcing ribs, which divide the longitudinal reinforcing ribs into the first reinforcing rib segment, the second reinforcing rib segment and the third reinforcing rib segment.

16. The thin film transfer vehicle according to claim 15, wherein all of four side edges of the baffle are provided with flanges protruding toward the second side surface of the baffle, and two ends of the longitudinal reinforcing ribs and two ends of the transverse reinforcing ribs are respectively connected to corresponding flanges.

17. The film transfer vehicle according to claim 1, wherein the bearing frame further comprises a top plate disposed at top ends of the plurality of columns, and a side of the bearing frame away from the baffle is provided with a transfer port configured to transfer the thin films into the bearing frame.

18. The film transfer vehicle according to claim 17, wherein the bearing frame further comprises a bottom bracket disposed on the base frame, and bottom ends of the plurality of columns are all fixed on the bottom bracket, and the top ends of the plurality of columns are fixedly connected to the top plate.

* * * * *